(12) United States Patent
Halbur et al.

(10) Patent No.: US 7,883,004 B2
(45) Date of Patent: Feb. 8, 2011

(54) TRANSACTION PRODUCT WITH SEPARABLE PIECES

(75) Inventors: Ted C. Halbur, Lino Lakes, MN (US); Adam W. Reynolds, Minneapolis, MN (US); Julie E. Hoppner, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 837 days.

(21) Appl. No.: 11/779,360

(22) Filed: Jul. 18, 2007

(65) Prior Publication Data

US 2009/0024519 A1 Jan. 22, 2009

(51) Int. Cl.
*G06Q 40/00* (2006.01)

(52) U.S. Cl. .................. 235/379; 235/380; 235/487; 283/61

(58) Field of Classification Search .......... 235/379, 235/380
See application file for complete search history.

(56) References Cited

U.S. PATENT DOCUMENTS

| | | | |
|---|---|---|---|
| D061,305 S | 8/1922 | Hopkins | |
| 1,806,273 A | 5/1931 | Williams | |
| 1,866,493 A | 7/1932 | Staats | |
| 2,178,730 A * | 11/1939 | Stein | 229/126 |
| 2,183,681 A | 12/1939 | Krout | |
| 2,305,195 A | 12/1942 | Richter | |
| 2,416,521 A | 2/1947 | Freiberg | |
| D158,255 S | 4/1950 | Geromanos | |
| 2,927,397 A | 3/1960 | Wilson | |
| 3,016,644 A | 1/1962 | Sass | |
| 3,155,392 A | 11/1964 | Ruderian | |
| 3,434,414 A | 3/1969 | Wright | |
| 3,440,747 A | 4/1969 | Oliver | |
| 3,537,195 A | 11/1970 | Gerds | |
| 3,581,708 A | 6/1971 | Beck | |
| 3,583,317 A | 6/1971 | Gibson | |
| D223,164 S | 3/1972 | Meth et al. | |
| 3,690,542 A | 9/1972 | Jernstrom | |
| 3,695,514 A | 10/1972 | Mascetti, Jr. | |
| D228,075 S | 8/1973 | Zelenko | |

(Continued)

FOREIGN PATENT DOCUMENTS

FR 2584983 1/1987

OTHER PUBLICATIONS

"Rocketmen: Axis of Evil Releases!," http://www.wizkidsgames.com/rocketmen/article.asp?cid=401469, Aug. 17, 2005.

(Continued)

*Primary Examiner*—Thien M. Le
*Assistant Examiner*—Christopher Stanford
(74) *Attorney, Agent, or Firm*—Griffiths & Seaton PLLC (57) ABSTRACT

A transaction product includes a substrate and an account identifier. The substrate defines a plurality of pieces separable from a remainder of the substrate. Following separation of the plurality of pieces from the remainder of the substrate, the plurality of pieces are configured to be assembled with one another to define a three-dimensional object. The account identifier is attached to the substrate and links the transaction product to at least one of an account and a record, wherein the account identifier is machine readable by a point-of-sale terminal. Stored-value cards, combinations, methods of facilitating use of a transaction product and other embodiments are also disclosed.

31 Claims, 10 Drawing Sheets

U.S. PATENT DOCUMENTS

| | | | |
|---|---|---|---|
| 4,048,737 | A | 9/1977 | McDermott |
| 4,084,015 | A | 4/1978 | Patterson |
| 4,301,614 | A | 11/1981 | Newton |
| D264,853 | S | 6/1982 | Scavino et al. |
| 4,345,393 | A | 8/1982 | Price et al. |
| 4,648,548 | A | 3/1987 | Shin |
| 4,978,146 | A | 12/1990 | Warther et al. |
| 5,158,809 | A | 10/1992 | Proctor |
| 5,232,088 | A * | 8/1993 | Leondidis .................. 206/223 |
| 5,246,161 | A | 9/1993 | Kapp |
| 5,326,964 | A | 7/1994 | Risser |
| 5,575,384 | A | 11/1996 | Saye |
| 5,636,782 | A | 6/1997 | Moore |
| 5,655,944 | A | 8/1997 | Fusselman |
| 5,667,248 | A | 9/1997 | Mayer |
| 5,677,524 | A | 10/1997 | Haghiri-Tehrani |
| 5,720,158 | A | 2/1998 | Goade, Sr. |
| 5,777,305 | A | 7/1998 | Smith et al. |
| 5,818,030 | A | 10/1998 | Reyes |
| 5,829,790 | A | 11/1998 | Phillips |
| 5,840,355 | A | 11/1998 | Prescott et al. |
| 5,921,584 | A | 7/1999 | Goade, Sr. |
| 5,989,667 | A | 11/1999 | Tayebi |
| 6,006,988 | A | 12/1999 | Behrmann et al. |
| 6,224,108 | B1 | 5/2001 | Klure |
| 6,311,418 | B1 * | 11/2001 | Crowell .................. 40/124.08 |
| D454,910 | S | 3/2002 | Smith et al. |
| 6,355,285 | B1 | 3/2002 | Hoy |
| 6,439,613 | B2 | 8/2002 | Klure |
| 6,439,953 | B1 | 8/2002 | Liu |
| 6,475,054 | B1 | 11/2002 | Liu |
| 6,481,125 | B1 | 11/2002 | Pokrasoff |
| 6,485,801 | B1 | 11/2002 | Chen |
| 6,493,970 | B1 | 12/2002 | McCarthy et al. |
| 6,502,748 | B2 | 1/2003 | Berg et al. |
| 6,543,809 | B1 | 4/2003 | Kistner et al. |
| 6,575,803 | B1 | 6/2003 | Liu |
| 6,585,551 | B2 | 7/2003 | McClung et al. |
| 6,588,658 | B1 | 7/2003 | Blank |
| 6,626,732 | B1 | 9/2003 | Chung |
| 6,643,962 | B1 | 11/2003 | Panec et al. |
| 6,647,693 | B2 | 11/2003 | Bromberg |
| 6,666,378 | B2 | 12/2003 | Davila et al. |
| 6,715,795 | B2 | 4/2004 | Klure |
| 6,746,743 | B2 | 6/2004 | Knoerzer et al. |
| D498,788 | S | 11/2004 | Lubking |
| D511,543 | S | 11/2005 | Lubking |
| D512,456 | S | 12/2005 | Diaz et al. |
| 7,024,807 | B2 | 4/2006 | Street |
| 7,032,817 | B2 * | 4/2006 | Blank .................. 235/380 |
| 7,275,683 | B2 | 10/2007 | Lazarowicz et al. |
| 2002/0143697 | A1 | 10/2002 | Gotfried |
| 2004/0094610 | A1 | 5/2004 | Longo |
| 2004/0249748 | A1 | 12/2004 | Schultz et al. |
| 2005/0204600 | A1 * | 9/2005 | Lauer et al. .................. 40/594 |
| 2005/0230460 | A1 | 10/2005 | Ristau |
| 2006/0036492 | A1 | 2/2006 | Becker |
| 2006/0118639 | A1 | 6/2006 | Kean et al. |
| 2006/0231609 | A1 | 10/2006 | Lazarowicz et al. |
| 2007/0138248 | A1 | 6/2007 | Wallen et al. |

OTHER PUBLICATIONS

Goddard, Kevin, "Rocketmen Axis of Evil—The Basics of Rocketmen Part 1: Ships and Resources," http://www.wizkidsgames.com/rocketmen/article.asp?cid=39935, available at least as early as Nov. 11, 2005, per the Internet Archive available at www.archive.org.

Balsa Wood Postcard Aeroplane—Flying Glider in Mali, http:www.amazon.com/gp/product/B001YGJ94/ref=pd_lpo_k2_dp_s . . . B000HYQL4&pf_rd_m=ATVPDKIKX0DER &pf_rd_r=0DBPCKEW9KM1XJP79VTK, 4 pages, publicly available at least as early as 2007, more than one year prior to the effective U.S filing date of the present application.

Photographs of Gift Card Product, offered for sale in Target Stores more than one year prior to Apr. 5, 2007, 3 pages.

* cited by examiner

TRANSACTION PRODUCT WITH SEPARABLE PIECES

BACKGROUND OF THE INVENTION

Stored-value cards and other transaction products come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction products provide a number of advantages to both the consumer and the retailer.

SUMMARY OF THE INVENTION

One aspect of the present invention relates to a transaction product including a substrate and an account identifier. The substrate defines a plurality of pieces separable from a remainder of the substrate. Following separation of the plurality of pieces from the remainder of the substrate, the plurality of pieces are configured to be assembled with one another to define a three-dimensional object. The account identifier is attached to the substrate and links the transaction product to at least one of an account and a record, wherein the account identifier is machine readable by a point-of-sale terminal. Stored-value cards, methods of providing a stored-value card and other embodiments of stored-value or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or transaction product, such as a gift card, is adapted for making purchases of goods and/or services at, for example, a retail store or web site. According to one embodiment, an original consumer buys a transaction product to give a recipient who in turn is able to use it to pay for goods and/or services. In addition, a transaction product, according to embodiments of the present invention, provides the consumer and/or recipient with removable pieces configured to be assembled with one another to define a three-dimensional object, such as an animal, automobile, person, structure, etc. In one example, the transaction product is initially provided and supported on a backer, and the backer is configured to be manipulated to form a second three-dimensional object configured to enhance play with the three-dimensional object formed with at least a portion of the transaction product itself.

Turning to the figures, FIGS. 1-5 illustrate various views of one embodiment of a stored-value, financial, or other transaction product 10 including a substrate 12 having an activation area or account identifier 14 (FIG. 3) and defining a plurality of pieces 16 configured to be readily removed from the remainder of substrate 12. Account identifier 14 configures transaction product 10 for use a payment toward a purchase of goods and/or services. The plurality of pieces 16, on the other hand, are configured to be assembled to form a three-dimensional object 40 (FIG. 7) configured to amuse a bearer of transaction product 10.

Substrate 12 is any suitable material such as a somewhat rigid yet flexible material similar to that commonly used for identification cards, credit cards, etc. More specifically, in one embodiment, substrate 12 is a substantially planar member formed of paper, cardstock, plastic (e.g., polycarbonate, polystyrene, polyvinyl chloride (PVC), acrylonitrile butadiene styrene (ABS), polyethylene terephthalate (PET), teslin, polyactide (PLA) and acrylic), or other suitable material. In one embodiment, substrate 12 is formed of injection molded plastic or cut from sheet-stock plastic material. Substrate 12 can be formed in any other suitable planar or non-planar configuration as will be apparent to those of skill in the art upon reading this application.

In one embodiment, substrate 12 defines a first surface 20 (i.e., a first major surface) and a second surface 22 (i.e., a second major surface) opposite first surface 20 separated by a thickness of transaction product 10. In one embodiment, at least one of first surface 20 and second surface 22 is substantially planar.

In one embodiment, account identifier 14 (FIG. 3) is included on at least one of first surface 20 and second surface 22 and includes one or more of a bar code, a magnetic strip, a smart chip or other electronic device, a radio frequency identification (RFID) device, or other suitable identifier readily machine readable by a point-of-sale terminal, account access station, kiosk, or other suitable device. In one embodiment where account identifier 14 is machine readable, account identifier 14 is also readable by a bearer of transaction product 10 such that transaction product 10 can be used when a machine configured to read transaction product 10 is not present (e.g., when using transaction product 10 to make a purchase on a web site). For example, account identifier 14 may include a number or letter string or a personal identification number (PIN) identifying the associated account or record and/or a password (not illustrated) associated therewith. In one embodiment, account identifier 14 is printed on or otherwise applied to substrate 12, for example to second surface 22 of substrate 12.

Account identifier 14 indicates and, therefore, links transaction product 10 to, a financial or other stored-value account or record. The account or record indicates a value or balance (e.g., monetary value, points, minutes, or other balance) associated with transaction product 10 and optionally is maintained on a database, other electronic or manual record-keeping system, or, in the case of "smart cards" for example, on a chip or other electronic device on/in transaction product 10 itself. Accordingly, by scanning account identifier 14, the account or record linked to transaction product 10 is identified and can subsequently be activated, have amounts debited therefrom and/or have amounts credited thereto. Account identifier 14 is one example of means for linking transaction product 10 with an account or record.

In one embodiment, redemption indicia 26 (FIG. 3) are included on transaction product 10 such as on second surface 22 of substrate 12. Redemption indicia 26 indicate that transaction product 10 is redeemable for the purchase of goods and/or services and that, upon use, a value of the purchased goods and/or services will be deducted from the account or record linked to transaction product 10. In one embodiment, redemption indicia 26 include phrases such as "<NAME OF STORE> GiftCard," "This GiftCard is not redeemable for cash or credit except where required by law" and "This GiftCard is redeemable for merchandise or services at any of our stores or at our web site," and/or provides help (e.g., provides balance information) or phone line information in the case of a lost, stolen, or damaged stored-value card, etc.

Substrate 12 defines the plurality of pieces 16 (or otherwise stated a plurality of toy components) initially secured to, but configured to be readily removed from a remainder 30 of substrate 12. Since the plurality of pieces 16 and remainder 30 are all initially part of substrate 12, in one embodiment, the plurality of pieces 16 and remainder 30 are coplanarly positioned with respect to one another prior to their separation from one another. In one embodiment, the plurality of pieces 16 are formed by scoring substrate 12 along an outer perimeter 32 of each of the plurality of pieces 16.

In one embodiment, scoring substrate 12 includes one or more of forming a narrowing, cut, perforation, weakening or other feature allowing for the ready release or separation of the plurality of pieces from remainder 30 of substrate 12 without the use of tools. For example, by applying a small amount of pressure to each of the plurality of pieces 16, each of the plurality of pieces 16 can be punched out or transitioned away from remainder 30 of substrate 12. In view of the above, scoring of substrate 12 is an example of means for defining the plurality of pieces in substrate 12. In one embodiment, each of the plurality of pieces 16 is defined with one or more slots 34 extending from the corresponding outer perimeter 32 into an internal portion of the respective one of the plurality of pieces 16. Each slot 34 is configured to facilitate assembly of the corresponding one of the plurality of pieces 16 with another one of the plurality of pieces 16. In one embodiment, each slot 34 has a width substantially equal to a thickness of substrate 12.

For example, in one embodiment, the plurality of pieces 16 are configured to be removed or uncoupled from remainder 30 of substrate 12 and assembled with one another to form three-dimensional object 40, for instance, a person, an automobile, an animal, a fictional character, or other suitable toy. More specifically, as illustrated in FIGS. 1-7, three-dimensional object 40 is a toy dog or puppy. Accordingly, in one embodiment, the plurality of pieces 16 include a body piece 16a, leg pieces 16b, a head piece 16c and one or more dog toy pieces 16d. For example, additionally referring to FIG. 6, body piece 16a includes a number of slots 34 each configured to at least partially receive one of leg pieces 16b, head piece 16c and dog toy pieces 16d. Each of leg pieces 16b, head piece 16c and dog toy pieces 16d includes a slot for partially receiving body piece 16a.

Figure 6:
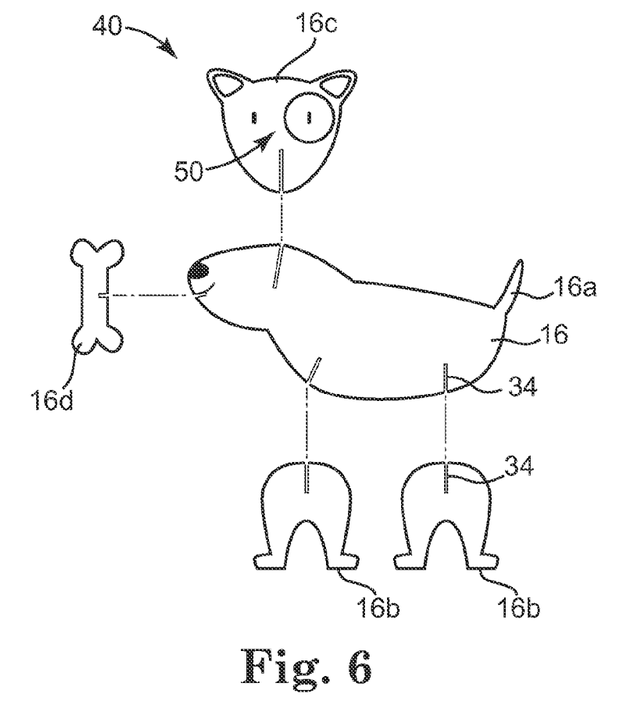
FIG. 6 is an exploded front view illustration of a plurality of pieces from the transaction product of FIG. 1 being arranged to form a three-dimensional object.
Figure 7:
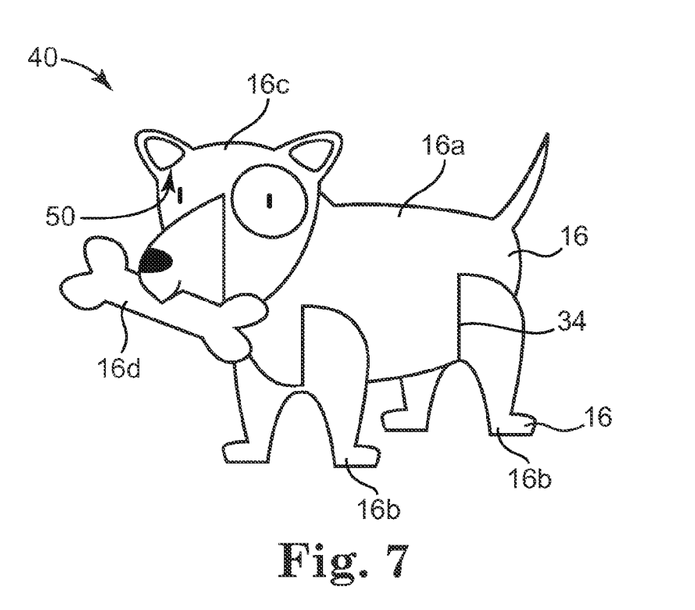
FIG. 7 is a perspective view illustration of the three-dimensional object of FIG. 6.

More specifically, the plurality of pieces 16 are coupled together one at a time to form three-dimensional object 40 as illustrated with additional reference to FIG. 7. In one example, the plurality of pieces 16 are configured to be assembled with one another to form three-dimensional object 40 without the use of a tools and/or a separate coupling agent (e.g., adhesive, rivets, etc.). For example, one at a time, a corresponding slot 34 of each of leg pieces 16b, head piece 16c and dog toy pieces 16d is aligned with a respective slot 34 of body piece 16a as generally illustrated in FIG. 6. Since each leg piece 16b, head piece 16c and dog toy piece 16d is formed from substrate 12, each leg piece 16b, head piece 16c and dog toy piece 16d is substantially planar. Therefore, to couple each leg piece 16b, head piece 16c and dog toy piece 16d with body piece 16a, each leg piece 16b, head piece 16c and dog toy piece 16d is turned to have an orientation substantially perpendicular to body piece 16a.

Following perpendicular alignment of head piece 16c with body piece 16a, slot 34 of head piece 16c receives a thickness of body piece 16a, and a corresponding one of the slots 34 of body piece 16a receives a thickness of head piece 16c. In this manner, head piece 16c is coupled with body piece 16a by virtue of a friction fit interaction between the corresponding slots 34 of head piece 16c and body piece 16a. Each of leg pieces 16b and dog toy piece(s) 16d are similarly coupled with corresponding slots 34 of body piece 16a. In this manner, in one example, the plurality of pieces 16 are coupled together without the use of tools and/or any separate coupling agent.

In one example, such as illustrated in FIG. 7, assembled three-dimensional object 40 is not only three-dimensional, but is also configured to independently stand on a support surface (not shown) such as a table, floor, etc. More particularly, leg pieces 16b are spaced from and extend parallel to one another such that each leg piece 16b contacts the support surface allowing three-dimensional object 40 to stand thereon. Other suitable arrangements of the plurality of pieces 16 will be apparent to those of skill in the art upon reading the present application to form other three-dimensional objects and/or to otherwise stand or be supported by the support surface.

Figure 1:
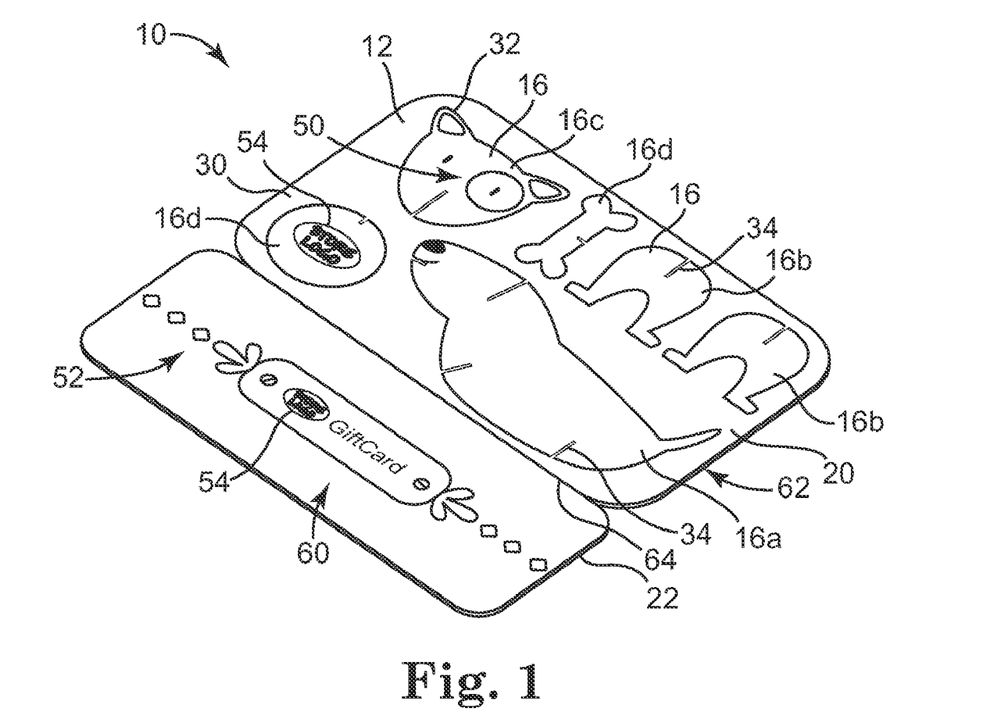
FIG. 1 is a perspective view illustration of a transaction product, according to one embodiment of the present invention.
Figure 2:
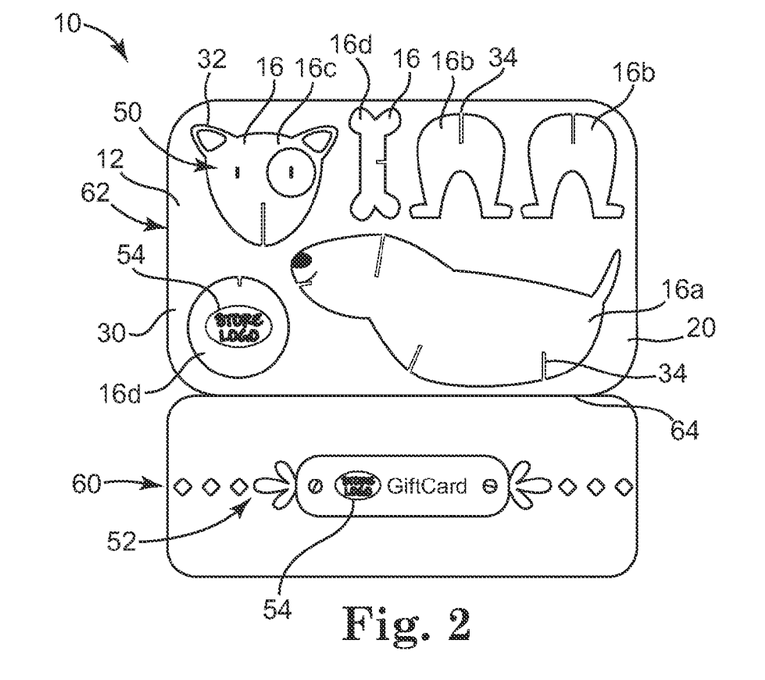
FIG. 2 is a front view illustration of the transaction product of FIG. 1.
Figure 3:
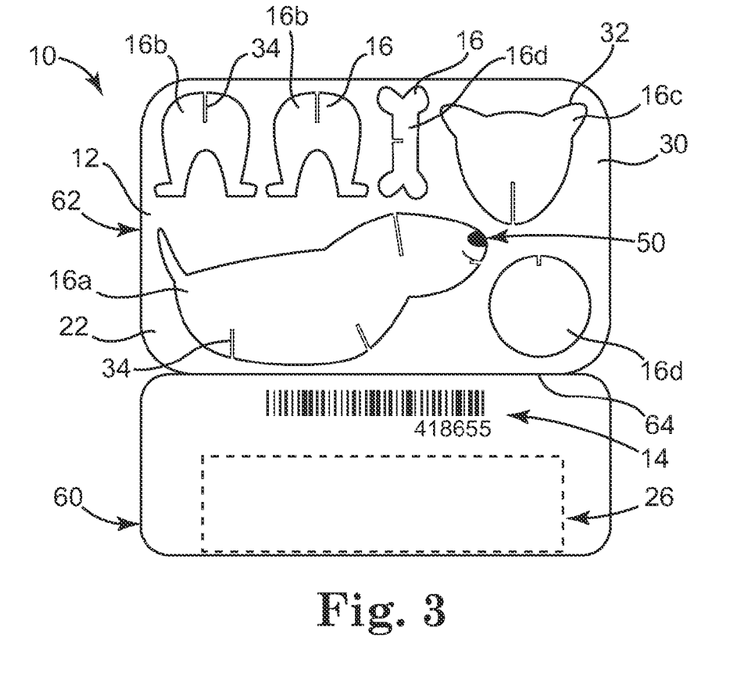
FIG. 3 is a rear view illustration of the transaction product of FIG. 1.
Figure 4:
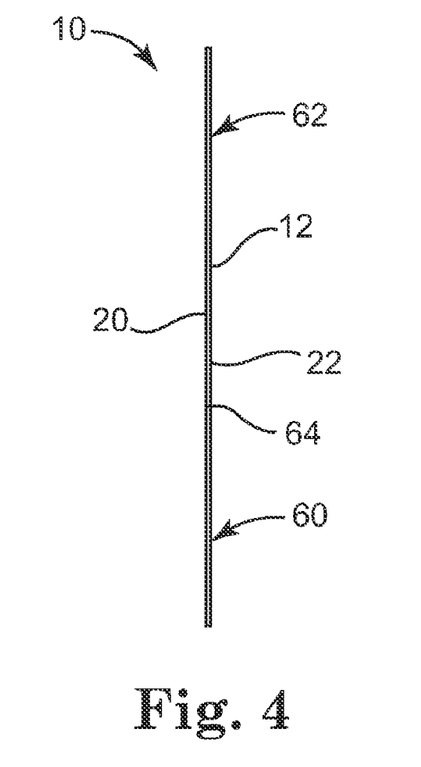
FIG. 4 is a right side view illustration of the transaction product of FIG. 1, wherein the left side view is a mirror image of the right side view.
Figure 5:
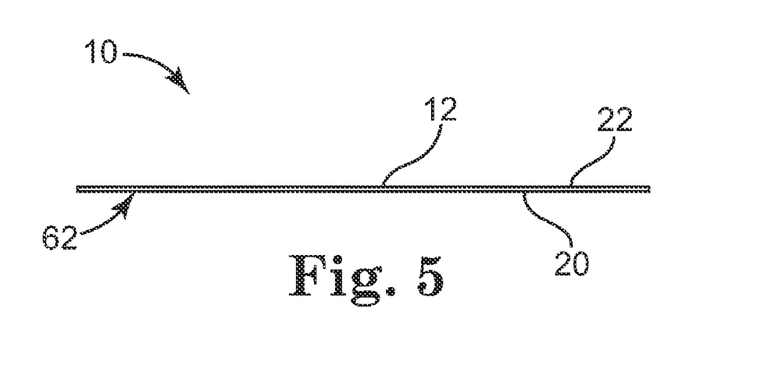
FIG. 5 is a top view illustration of the transaction product of FIG. 1, wherein the bottom view is a mirror image of the top view.

In one embodiment, substrate 12 includes accent indicia 50 on one or more of the plurality of pieces 16 to further distinguish and define three-dimensional object 40. For example, as illustrated in FIGS. 1-3, first surfaces 20 and/or second surface 22 include accent indicia 50 such as nose, eye, mouth and ear demarcations to further define three-dimensional object 40. Other indicia 52 may also be included on any other portion of substrate 12 for decorative or other purposes. In one example, indicia 52 include any suitable graphics, text or combinations thereof. In one embodiment, other indicia 52 include one or more brand identifiers 54. Brand identifiers 54 include one or more of a logo, text, trademark, etc. that associate transaction product 10 with at least one of a product, a brand, a store, etc. Other indicia or additional features may also be included on substrate 12 of transaction product 10 as will be apparent to those of skill in the art upon reading this application. In one example, any one or more of indicia 26, 50, 52, etc. may not be included on transaction product 10.

In one embodiment, substrate 12 defines a first card 60 and a second card 62 initially attached to one another, but configured to be readily separable at a desired time, for example, after initial purchase of transaction product 10. In one example, first card 60 and second card 62 are configured to be separated from one another without the use of tools (for example, to be snapped along a predefined score lines, etc.). First card 60 and second card 62 are each illustrated in FIGS. 1-5 as being as being substantially rectangular in shape; however, first card 60 and second card 62 may be formed in any other suitable shape(s).

In one embodiment, first card 60 includes account identifier 14 and is configured for use to access (i.e., load value on, deduct value from, etc.) the account or record associated with account identifier 14. As such, first card 60 may be used toward the purchase of goods and/or services and/or may to otherwise access the account or record while coupled with and/or while separated from second card 62.

In one example, second card 62 includes all of the plurality of pieces 16 (i.e., first card 60 does not include any of the plurality of pieces 16). As such, first card 60 and second card 62 can be separated, and first card 60 can be used for transactional purposes while second card 62 is used to entertain the bearer of second card 62 with the plurality of pieces 16 and/or the assembly of the plurality of pieces into three-dimensional object 40. In one example, upon separation from second card 62, first card 60 is sized and shaped to readily fit within a wallet of the bearer of first card 60. Separation of first card 60 and second card 62, therefore, allows for more convenient storage of first card 60 (i.e., the transaction portion of transaction product 10) and easy access and bearer interaction with second card 62 (i.e., the amusing or non-transactional portion of transaction product 10).

Stated differently, transaction product 10 is a two-piece stored-value card, comprising a first piece 60, adapted for use in accessing the associated account or record, and a second piece 62, readily releasably attached to first piece 60 and including the non-transactional or amusing components of transaction product 10. First piece 60 and second piece 62 are formed from common substrate 12 having a score line 64 extending therebetween to facilitate separating first piece 60 from second piece 62. Score line 64 is optionally in the form of a narrowing, cut, perforation, weakening, or other features allowing ready release or separation of first piece 60 from second piece 62 without the use of tools. As such, first piece 60 and second piece 62 can be released from one another to allow separate use of first piece 60 toward the purchase of goods and/or services and play with second piece 62 or at least portions thereof for amusement.

Figure 8:
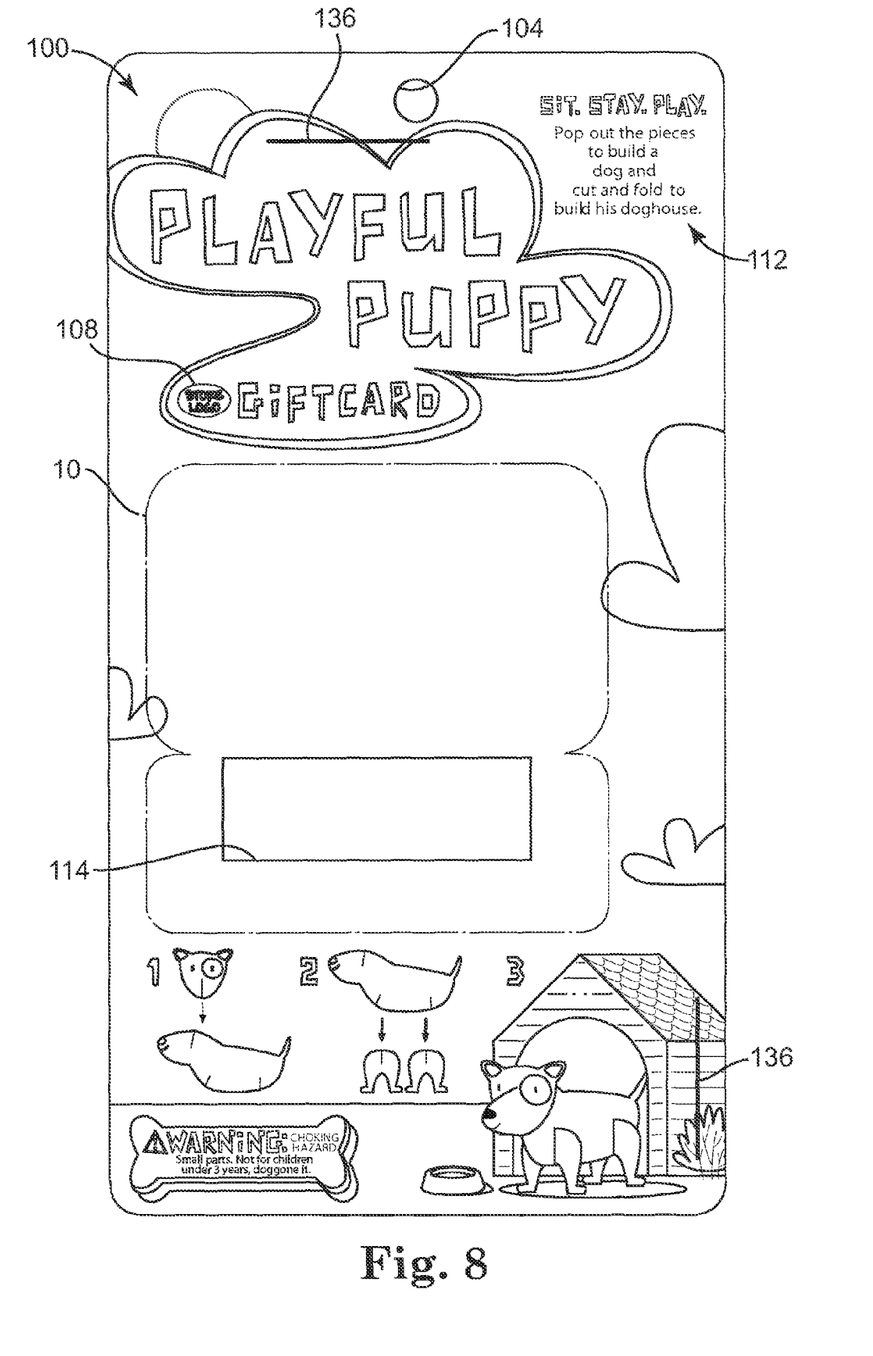
FIG. 8 is a front view illustration of a backer, according to one embodiment of the present invention.
Figure 9:
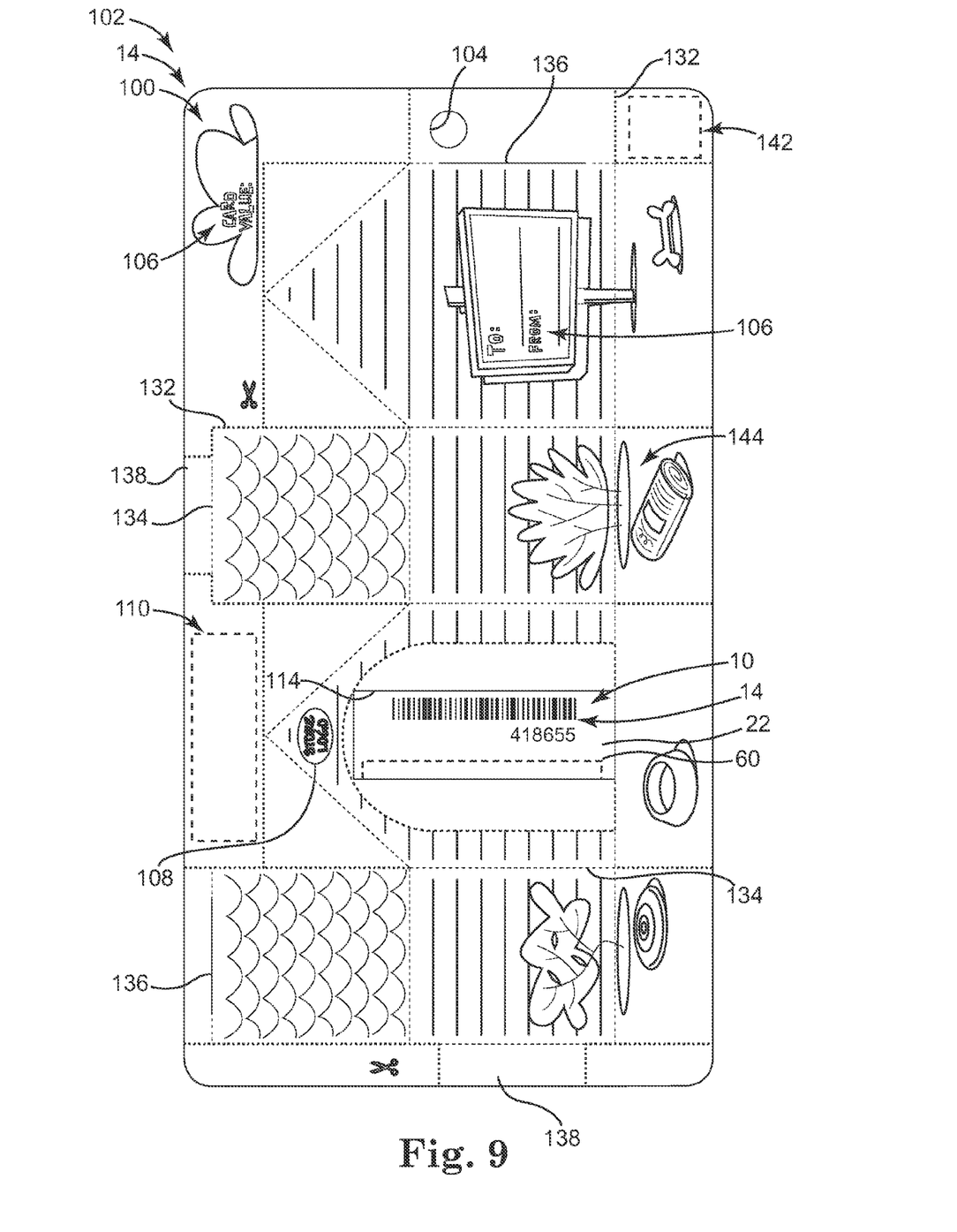
FIG. 9 is a rear view illustration of a transaction product assembly including the backer of FIG. 8 and the transaction product of FIG. 1, according to one embodiment of the present invention.

FIGS. 8 and 9 illustrate a carrier or backer 100 configured to be selectively coupled with and to support transaction product 10. Transaction product 10, which is represented in phantom lines in FIG. 8 for illustrative purposes so as to not obstruct backer 100, is readily releasably attached to backer 100, for example by removable adhesive, overlying skinning material, or the like. Backer 100 and transaction product 10 collectively define a transaction product assembly 102 (FIG. 9). Backer 100 comprises a single layer or multiple layers of paper or plastic material, for example, generally in the form of a relatively stiff but bendable/flexible card. Use of other materials is also contemplated. In one example, backer 100 defines an aperture 104 near an end thereof to facilitate hanging transaction product 10 during display on a rack in a retail setting, etc.

Backer 100 displays indicia, graphics or text information including store logo(s), store name(s), slogans, advertising, instructions, directions, brand indicia, promotional information, holiday indicia, seasonal indicia, media format identifiers, characters and/or other information. For example, indicia 106 include to, from, amount and/or message fields. The fields of indicia 106 provide areas of backer 100 configured to be written upon by a consumer to personalize backer 100 for presentation as a gift to a particular recipient, for a particular purpose and/or to indicate a value of transaction product 10. In one embodiment, transaction product 10 includes brand indicia 108, which identifies a store, brand, department, etc. and/or services associated with transaction product 10.

Referring to FIG. 9, in one embodiment, backer 100 includes indicia 110 indicating that transaction product 10 is redeemable for the purchase of goods and/or services and that upon use, a value of the purchased goods and/or services will be deducted from the financial account or record linked to transaction product 10. In one embodiment, indicia 110 include phrases such as "<NAME OF STORE> GiftCard," "This GiftCard is not redeemable for cash or credit except where required by law" and "This GiftCard is redeemable for merchandise or services at any of our stores or at our web site," and/or provides help (e.g., provides balance information) or phone line information in case of a lost, stolen, or damaged transaction product 10, etc.

In one example, indicia 112 promote that transaction product 10 includes the plurality of pieces 16 that can be assembled into a three-dimensional object and/or illustrates or otherwise instructs the bearer of transaction product 10 on how to assemble the plurality of pieces 16 to form three-dimensional object 40. As such, indicia 112 further promote the sale of transaction product 10 by drawing the attention of a potential consumer to the non-transactional features of transaction product 10.

Any of indicia 26, 50, 52, 106, 108, 110 and 112 or other indicia optionally may appear anywhere on backer 100 or transaction product 10. Additional information besides that specifically described and illustrated herein may also be included and/or one or more of indicia 26, 50, 52, 106, 108, 110 and 112 may be eliminated.

In one embodiment, backer 100 includes a window or opening 114 for displaying account identifier 14 of transaction product 10 therethrough as illustrated in FIG. 9. As previously described, account identifier 14 is adapted for accessing an account or a record associated with transaction product 10 for activating, loading value to, or debiting value from the account or record. Accordingly, opening 114 allows viewing or other access to account identifier 14 to activate and/or load transaction product 10 without removing transaction product 10 from backer 100. In one embodiment, a portion of backer 100 alternatively is configured to be folded away from the remainder of backer 100 to access account identifier 14 without removing transaction product 10 from backer 100.

Figure 10:
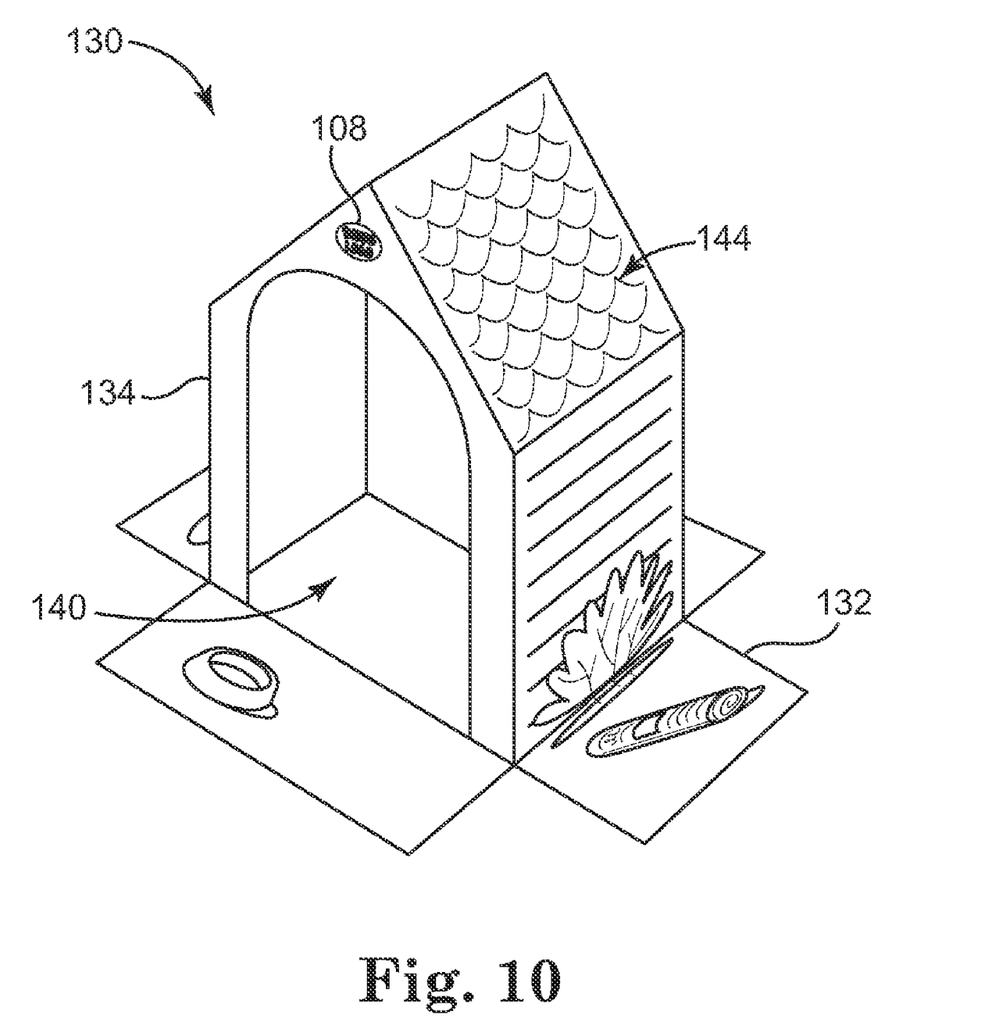
FIG. 10 is a perspective view illustration of a portion of the backer of FIG. 8 converted into a three-dimensional object, according to one embodiment of the present invention.

As illustrated with reference to FIGS. 9 and 10, in one embodiment, backer 100, is configured to be manipulated from its initial, substantially planar form to define a second three-dimensional object 130 (where three-dimensional object 40 is considered a first three-dimensional object). For instance referring to FIG. 9, backer 100 includes one or more dotted, perforated or otherwise denoted cut lines 132 indicating where backer 100 should be cut by the bearer of backer 100 and one or more scored or otherwise denoted fold lines 134 (indicated with dashed lines in FIG. 8) configured to facilitate folding of backer 100. The bearer of backer 100 cuts backer 100 along cut lines 132 and folds backer 100 along fold lines 134 to form second three-dimensional object 130.

In one embodiment, backer 100 additionally includes slots or cuts 136 extending entirely through backer 100 and configured to receive other a portion of backer 100 to hold backer 100 in a folded position (i.e., in the position forming three-dimensional object 130). For example, in one embodiment, upon cutting backer 100 along cut lines 132, one or more tabs 138 are formed by backer 100. Each tab 138 is sized and positioned to be received by a corresponding one of cuts 136 when backer 100 is folded to form second three-dimensional object 130 to maintain backer 100 is the shape of second three-dimensional object 130.

In one embodiment, backer 100 is manipulated to form second three-dimensional object 130 that is compatible and/or otherwise specifically configured for play or use with first three-dimensional object 40. For instance, where first three-dimensional object 40 is a dog, other animal, automobile, etc., second three-dimensional object 130 may be a shed, house (e.g., a dog house) or other enclosure as illustrated in FIG. 10 defining a chamber 140 configured to at least partially receive and house first three-dimensional object 40. In one embodiment, backer 100 includes indicia 142 instructing the bearer of backer 100 on how to cut, fold and/or otherwise manipulate backer 100 to form second three-dimensional object 130. For example, indicia 142 may state "Cut along dotted lines, fold along score lines and insert tabs to build." Other accent indicia 144 may also be included on backer 100 to enhance the appearance of three-dimensional object 130. For example, where three-dimensional object 130 is a dog house, indicia 144 include demarcations indicating a roof, siding, dog toys, surrounding grass, etc. Second three-dimensional objects other than enclosures as described above will be apparent to those of skill in the art upon reading the present application.

Figure 11:
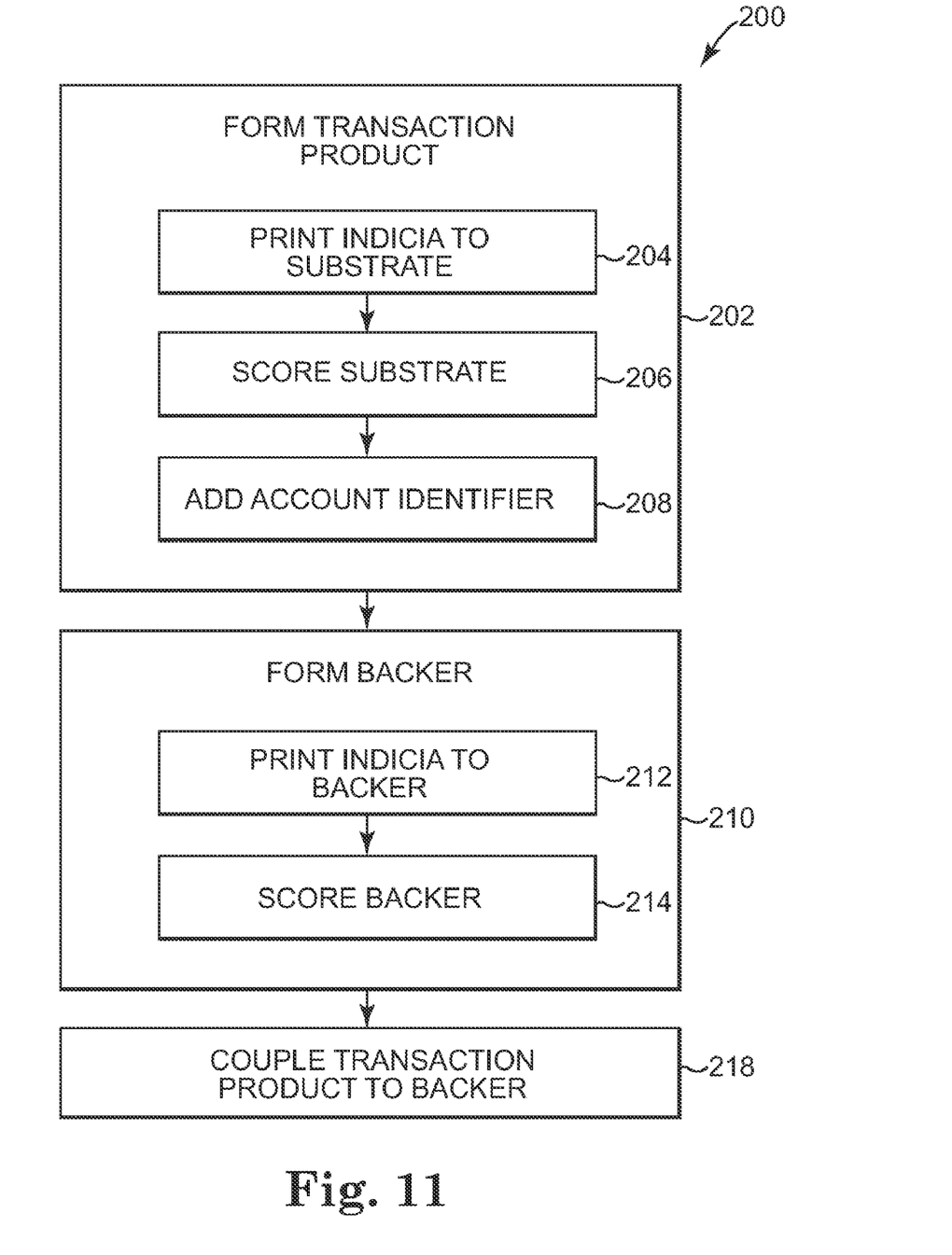
FIG. 11 is a flow chart illustrating a method of forming a transaction product, according to one embodiment of the present invention.

One embodiment of a method of forming transaction product 10 is generally indicated at 200 in FIG. 11 and is described with additional reference to FIGS. 1-9. At 202, transaction product 10 is formed. More specifically, at 204, substrate 12 is provided and indicia such as one or more of indicia 26, 50 and 52 and/or other indicia are printed on substrate 12. In one embodiment, printing to substrate 12 includes printing at least a portion of account identifier 14 to first surface 20 and/or second surface 22, for example, where account identifier 14 includes a bar code and/or number or character sequence. In one example, account identifier 14 is embedded within or otherwise provided as part of substrate 12 prior to operation 204.

Following printing at 204, then at 206, substrate 12 is scored, more specifically, is formed to have a narrowing, cut, perforation, weakening or other feature(s) allowing ready release or separation of the plurality of pieces 16 from remainder 30 of substrate 12. In particular, in one example, substrate 12 is scored around the respective perimeters 32 of each of the plurality of pieces 16 such that each of the plurality of pieces 16 can subsequently be readily separated from remainder 30 of substrate 12. In one embodiment, substrate 12 is additionally scored along score line 64 of substrate 12 between first card 60 and second card 62 to allow first card 60 and second card 62 to be readily separated from one another.

At 208, any portion of account identifier 14 not otherwise printed to substrate 12 at 204 or otherwise integrally formed with substrate 12 is added to substrate 12. Of course, where account identifier 14 has already or otherwise been applied or formed as part of substrate 12, operation 208 can be eliminated. In one example, at 208, account identifier 14 is adhered to or otherwise coupled to substrate 12 as will be apparent to one of skill in the art upon reading the present application. Although primarily described above as being performed in the order illustrated in FIG. 11, it should be understood that operations 204, 206 and 208 can be performed in any other suitable order or sequence.

At 210, backer 100 is optionally formed. More specifically, at 212, in one embodiment, backer 100 is printed with indicia such as indicia 106, 108, 110, 112, 142 and 144 or other suitable demarcations as will be apparent to those of skill in the art upon reading the present application. In one example, printing backer 100 at 212 includes printing lines or other indications of the position of cut lines 132 and fold lines 134 on backer 100. At 214, which may be performed before or after printing backer 100 at 212, backer 100 is scored along fold lines 134 to facilitate ease of folding and assembly of backer 100 to form second three-dimensional object 130. In one example, scoring backer 100 at 214 includes perforating backer 100 along one or more of cut lines 132 to facilitate cutting of backer 100 and/or to permit tearing of backer 100 along cut lines 132 without the use of tools.

Although illustrated in FIG. 11 as being performed in sequence, in one embodiment, transaction product 10 and backer 100 are formed at 202 and 210 substantially simultaneously or backer 100 may be formed at 210 prior to forming transaction product 10 at 202. In any event, once transaction product 10 and backer 100 are formed, then at 218, transaction product 10 is coupled with backer 100 using adhesive, skinning and/or any other suitable means for coupling to form transaction product assembly 102 (FIG. 9). In one embodiment, transaction product assembly 102 is configured for display in a retail setting, such as to hang via aperture 104 from a display rod, etc.

Figure 12:
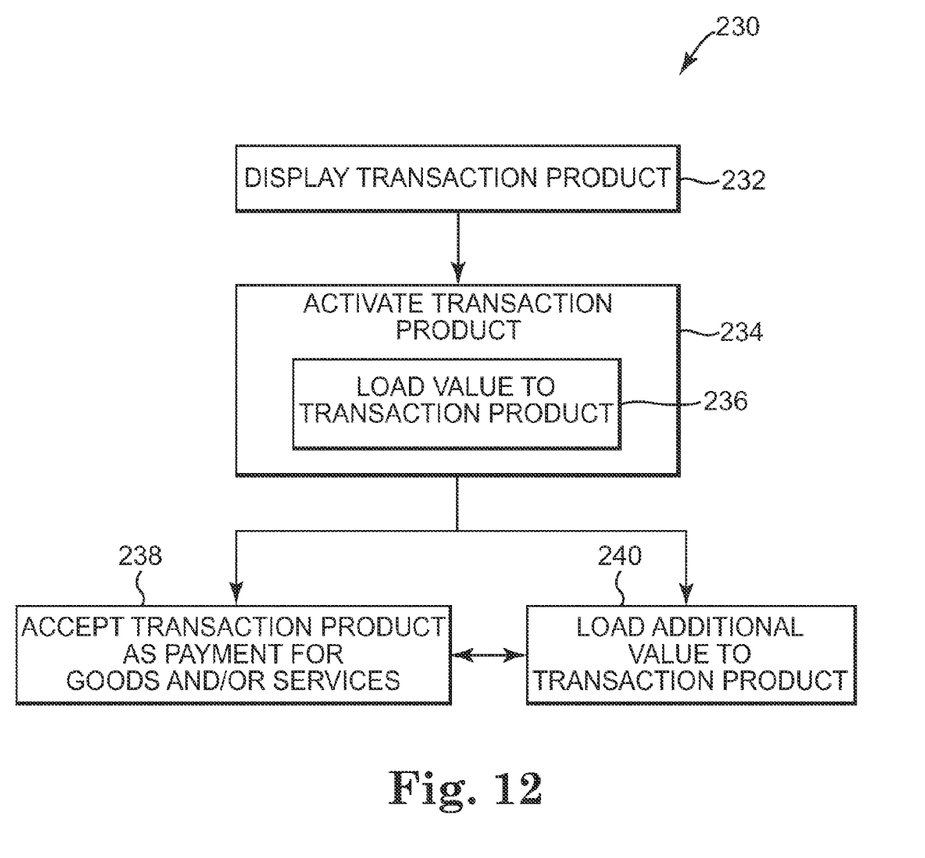
FIG. 12 is a flow chart illustrating a method of encouraging purchase and facilitating use of a transaction product, according to one embodiment the present invention.

FIG. 12 is a flow chart illustrating one embodiment of a method 230 of encouraging purchase and facilitating use of transaction product 10 by consumers and/or recipients. At 232, transaction product 10 is placed on or hung from a rack, shelf, or other similar device to display transaction product 10 for sale to potential consumers. In one embodiment, a depiction of transaction product 10 is placed on a web site for viewing and purchase by potential consumers.

At 234, a consumer who has decided to purchase transaction product 10 presents transaction product 10 on backer 100 to a retail store employee, retail store kiosk, remote terminal, or other person or device to scan account identifier 14 to access an account or record linked to account identifier 14. In particular, account identifier 14 is scanned or otherwise accessed, for example through opening 114 of backer 100 to activate transaction product 10. Upon accessing the account or record, then, at 236, value is added to the account or record in the form of monetary value, points, minutes, etc. Thus, transaction product 10 is activated and loaded. In one embodiment, value is already associated with the account or record linked to account identifier 14; in such an embodiment, account identifier 14 is scanned to activate the account or record and operation 236 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 232, then, at 234, transaction product 10 may be activated in any suitable method and may not require the physical scanning of account identifier 14 to be activated or to otherwise access the associated account or record such as at 236.

In one example, at 238, the retail store or other affiliated retail setting or web site accepts transaction product 10 as payment toward the purchase of goods and/or services made by the current bearer of transaction product 10. In particular, the value currently loaded on transaction product 10 (i.e., value stored or recorded in the account or record linked to account identifier 14) is applied toward the purchase of goods and/or services. At 240, additional value is optionally loaded on transaction product 10 at a point-of-sale terminal, kiosk, web site or other area of the retail store or related setting.

Upon accepting transaction product 10 as payment at 238, the retail store or related setting can subsequently perform either operation 238 or operation 240 as requested by a current bearer of transaction product 10. Similarly, upon loading additional value on transaction product 10 at 240, the retail store or related setting can subsequently perform either operation 240 again or operation 238. In one example, the ability to accept transaction product 10 as payment for goods and/or services is limited by whether the account or record associated with transaction product 10 has any value stored or recorded therein at the time of attempted redemption.

Figure 13:
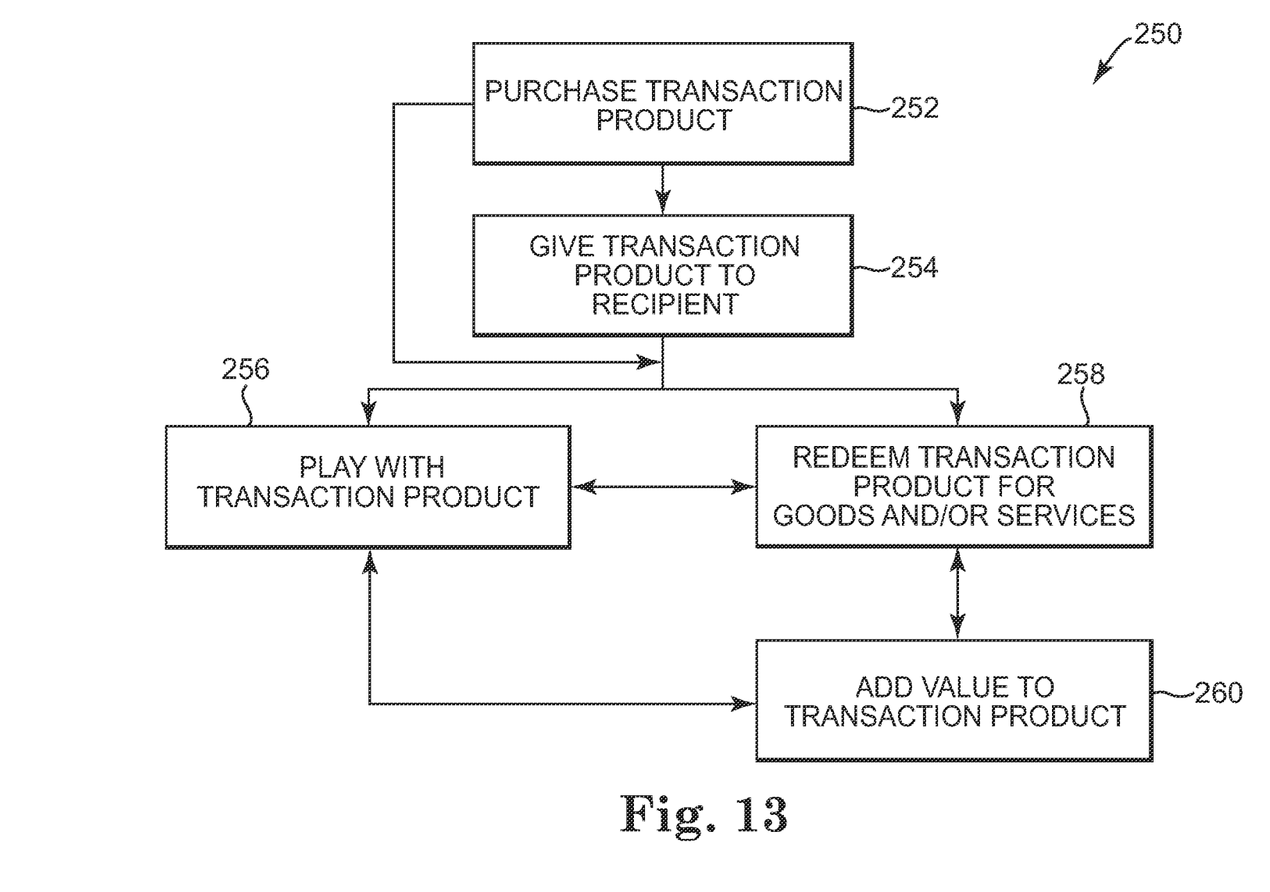
FIG. 13 is a flow chart illustrating a method of using a transaction product, according to one embodiment of the present invention.

FIG. 13 is a flow chart illustrating one embodiment of a method 250 of using transaction product 10 (e.g., FIGS. 1-5). At 252, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 102 (FIG. 9) along with backer 100. Upon purchasing transaction product 10, a retail store employee, a retail store kiosk, or other person or device scans account identifier 14 (FIGS. 3 and 9) through opening 114 of backer 100 or otherwise reads or accesses account identifier 14. Upon accessing account identifier 14, the account or record linked to account identifier 14 is accessed and activated to load value onto transaction product 10 (i.e., load value to the account or record associated with transaction product 10). In one embodiment, such as where transaction product 10 is purchased at 252 via a web site, actual scanning or other mechanical detection of account identifier 14 may be eliminated.

At 254, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 254.

At 256, the consumer, recipient, or other current bearer of transaction product 10 is able to play with or otherwise use transaction product 10 or at least a portion thereof for amusement. More specifically, as described above, the bearer is able to remove each of the plurality of pieces 16 from remainder 30 of transaction product 10 or, more particularly, of second card 62 generally without the use of tools. Then, the bearer is able to construct a first three-dimensional object 40 by coupling the plurality of pieces 16 to one another using slots 34 as described above. Upon assembly of first three-dimensional object 40, the bearer can use three-dimensional object 40 as a toy, etc. providing additional amusement to the bearer and/or other observers of three-dimensional object 40.

In one embodiment, playing with transaction product 10 may also include playing with backer 100 or at least a portion thereof. For example, playing with backer 100 includes cutting or tearing backer 100 along cut lines 132 and folding backer 100 along fold lines 134 to form second three-dimensional object 130. In one embodiment, second three-dimensional object 130 is specifically configured to provide a complementary toy as compared to first three-dimensional object 40 such that first three-dimensional object 40 and second three-dimensional object 130 are configured to interact with one another during play. For instance, first three-dimensional object 40 may be an animal (e.g., a dog, etc.), automobile, etc. and second three-dimensional object 130 may be a house, shelter, garage or other enclosure configured to receive first three-dimensional object therein as described above. Other complementary three-dimensional objects will be apparent to those of skill in the art upon reading the present application.

At 258, the product bearer redeems transaction product 10 for goods and/or services from the retail store or web site. At 260, the bearer of transaction product 10 optionally adds value to transaction product 10, more particularly, to the account or record associated with account identifier 14 included therewith, at the retail store or over the Internet (i.e., via the web site). Upon playing with at least a portion of transaction product 10 and/or backer 100 at 256 or redeeming transaction product 10 at 258 or adding value to transaction product 10 at 260, the bearer of transaction product 10 subsequently can perform either of operations 256, 258 or 260 as desired. In one embodiment, the ability of the bearer to repeat redeeming transaction product 10 at 258 is limited by whether the account or record linked with transaction product 10 has any remaining value stored or recorded therein at the time of attempted redemption.

Although described above as occurring at a single retail store or web site, in one embodiment, purchasing transaction product 10 at 252, redeeming transaction product 10 at 258 and adding value to transaction product 10 at 260, can each be performed at any one of a number of stores adapted to accept transaction product 10 or over the Internet. In one example, a number of stores are each part of a chain or are similarly branded stores. In one example, a number of stores include at least one web site and/or at least one conventional brick and mortar store.

Stored-value cards and other transaction products come in many forms, according to embodiments of the invention. The gift card, like other stored-value cards and transaction products, can be "re-charged" or "re-loaded" at the direction of the original consumer, the gift recipient, or a third party. The term "loading on" or "loaded on" herein should be interpreted to include adding to the balance of an account or record associated with a transaction product. The balance associated with the s transaction product declines as the transaction product is used, encouraging repeat visits or use. The transaction product remains in the user's purse or wallet, serving as an advertisement or a reminder to revisit the associated merchant. Transaction products according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A transaction product comprising:
   a card including a plurality of pieces separable from a remainder of the card, wherein the plurality of pieces are configured to be assembled with one another to define a three-dimensional object following separation of the plurality of pieces from the remainder of the card, and the card is substantially planar and formed as a single piece of a rigid substrate; and
   an account identifier attached to the card and linking the transaction product to at least one of an account and a record, wherein the account identifier is machine readable by a point-of-sale terminal; and
   wherein each of the plurality of pieces defines an outer perimeter and a slot extending from the outer perimeter into a respective one of the plurality of pieces, the slot being configured to facilitate coupling of the plurality of pieces to one another to form the three-dimensional object such that each of the plurality of pieces extends in a plane that intersects and is angled relative to a different plane of at least another one of the plurality of pieces.

2. The transaction product of claim 1, wherein the account identifier is a bar code.

3. The transaction product of claim 1, wherein the account identifier includes at least one of a bar code, a magnetic strip, a smart chip, and a radio frequency identification (RFID) device.

4. The transaction product of claim 1, wherein the plurality of pieces are removable from the remainder of the card without using tools.

5. The transaction product of claim 1, wherein the plurality of pieces include a body piece, at least one leg piece, and a head piece configured to be assembled to form at least a portion of the three-dimensional object, and wherein the three-dimensional object is one of a person, an animal, and a fictional character.

6. The transaction product of claim 1, wherein the plurality of pieces are configured to be assembled to form the three-dimensional object without use of tools and without use of a separate coupling agent.

7. The transaction product of claim 1, wherein the card is a first card, the transaction product includes a second card attached to the first card, and the account identifier is fixedly secured to the second card such that the account identifier is attached to the first card via the second card.

8. The transaction product of claim 1, in combination with a backer selectively coupled with and configured to support the card, wherein the backer is formed separately from the card.

9. The transaction product of claim 1, in combination with a carrier formed separately from the transaction product and coupled with and supporting the transaction product, wherein the carrier defines a plurality of cut lines and a plurality of fold lines configured such that the carrier can be cut along the plurality of cut lines and folded along the plurality of fold lines to form a three-dimensional toy, wherein the carrier includes indicia instructing a bearer of the carrier to cut along the cut lines and fold along the fold lines to form the three-dimensional toy.

10. The transaction product of claim 1, wherein the rigid substrate is one of an injection molded plastic and a piece cut from a sheet-stock plastic material.

11. The transaction product of claim 7, wherein the first card and the second card are both formed substantially entirely as a single piece substrate including the plurality of pieces and are configured to be separated from one another by breaking the single piece substrate along a predefined separation line without use of tools.

12. The combination of claim 8, wherein the three-dimensional object formed by the plurality of pieces is a three-dimensional animal object, and the backer is foldable to form a three-dimensional house for the three-dimensional animal object.

13. The combination of claim 9, wherein:
   the three-dimensional object is an animal play object having portions thereof extending in at least two different planes, and
   the three-dimensional toy is a house sized and shaped to selectively and at least partially receive the animal play object therein.

14. The transaction product of claim 11, wherein the first card, the second card, and the plurality of pieces are all collectively formed as a single piece substrate and are separable from one another without use of separate tools.

15. The transaction product of claim 7, in combination with a backer attached to and supporting the first card and the second card.

16. The combination of claim 12, wherein each of the three-dimensional animal object and the three-dimensional house are configured to independently stand upwardly from a separate support surface when positioned on the separate support surface.

17. A transaction product comprising:
   a card including a plurality of pieces separable from a remainder of the card, wherein:
      the plurality of pieces are configured to be assembled with one another to define a three-dimensional object following separation of the plurality of pieces from the remainder of the card,
      each of the plurality of pieces defines an outermost perimeter and a slot extending from the outermost perimeter into a respective one of the plurality of pieces,
      the slot is configured to facilitate coupling of the plurality of pieces to one another to form a three-dimensional object,
      upon assembly of the plurality of pieces to form the three-dimensional object, each slot receives a portion of an adjacent one of the plurality of pieces such that each of the plurality of pieces extends substantially perpendicular to and in a different plane than the adjacent one of the plurality of pieces; and
   an account identifier attached to the card and linking the transaction product to at least one of an account and a record, wherein the account identifier is machine readable by a point-of-sale terminal.

18. A stored-value card comprising:
   a substantially planar substrate;
   means for defining a plurality of toy components within and as part of the substantially planar substrate such that each of the plurality of toy components is removable from a remainder of the substantially planar substrate without use of tools, wherein:

each of the plurality of toy components includes an outer perimeter and a slot extending inwardly from the outer perimeter, the plurality of toy components are configured to be assembled with one another using the slot of at least one of the plurality of toy components to define a toy, and when the plurality of toy components are assembled with one another, each of the plurality of toy components extends in a separate plane than at least another one of the plurality of toy components; and means for linking the substantially planar substrate with at least one of an account and a record having a value associated therewith such that at least a portion of the substantially planar substrate can be used as payment toward a purchase of one or more of goods and services.

19. The stored-value card of claim 18, wherein the plurality of toy components are coplanarly positioned with respect to the remainder of the substrate prior to removal of the plurality of toy components from the remainder of the substantially planar substrate.

20. The stored-value card if claim 18, wherein the toy is a first toy, and the stored-value card further comprises means for supporting the substantially planar substrate, the means for supporting being foldable to define a second toy.

21. The stored-value card of claim 18, wherein the plurality of toy components include means for being assembled with one another without the use of a separate coupling agent.

22. The stored-value card of claim 18, wherein the at least another one of the plurality of toy components extends in a second plane, and the separate plane intersects and is angled away from the second plane of the at least another one of the plurality of toy components.

23. A method of facilitating use of a transaction product, the method comprising:

displaying a first card coupled with two or more pieces of a toy for retail sale, the first card including an account identifier linked to an account or record, wherein:

at least one of the two or more pieces of a toy includes an outer perimeter and a slot extending inwardly from the outer perimeter, and the slot has a width substantially equal to a thickness of a different one of the two or more pieces of the toy such that the at least one of the two or more pieces of the toy is configured to receive the different one of the two or more pieces of the toy to couple the two or more pieces of the toy to one another such that the at least the one of the two or more pieces of the toy and the different one of the two or more pieces of the toy extend in different planes;

indicating to potential consumers that the two or more pieces of the toy are readily uncouplable from the first card and are configured to be assembled to form the toy;

accessing an account or record using the account identifier to at least one of activate the account or record and to add value to the account or record.

24. The method of claim 23, further comprising accepting the first card as payment toward the purchase of goods and/or services based in part upon a value amount in the account or record.

25. The method of claim 23, wherein displaying the first card includes displaying the first card on a backer coupled with the first card, the toy is a first toy, and the method further comprises indicating to potential consumers that the backer is marked and configured to be manipulated to form a second toy configured for play with the first toy.

26. The method of claim 23, wherein displaying the first card coupled with the two or more pieces of a toy for retail sale includes forming the two or more pieces of the toy within a second card coupled with the first card.

27. The method of claim 23, wherein:

the toy is an animal toy, and displaying the first card coupled with two or more pieces of the toy for retail sale includes displaying the first card and the two or more pieces supported on a separate backer, the backer including fold lines and demarcations instructing a user on how to form the backer into a house for the animal toy by using the fold lines and demarcations.

28. The method of claim 26, wherein the first card and the second card are formed substantially entirely as a single piece of a substrate and are configured to be readily separated from one another along a predefined separation line, and the single piece of the substrate is substantially planar.

29. A financial product comprising:

a first piece that is substantially planar;

an account identifier fixedly attached to the first piece and linking the first piece to at least one of an account and a record, wherein the account identifier is machine readable by a point-of-sale terminal;

a second piece including a plurality of toy components each configured to be readily removed from a remainder of the second piece without use of tools, wherein:

the second piece is substantially planar, each of the plurality of toy components is substantially coplanar with others of the plurality of toy components prior to removal of each of the plurality of toy components from the remainder of the second piece, and the plurality of toy components are configured to be reassembled with one another in a non-coplanar manner without the use of tools to define a predefined three-dimensional object; and a backer supporting the first piece and the second piece; wherein:

each of the plurality of toy components defines an outer perimeter and a slot extending from the outer perimeter into a respective one of the plurality of toy components, and upon reassembly of the plurality of toy components to form the predefined three-dimensional object, each slot receives a portion of another one of the plurality of toy components and at least one of the plurality of toy components is positioned substantially perpendicular to at least another one of the plurality of toy components.

30. The financial product of claim 29, wherein the first piece and the second piece are coupled to one another as part of a common substrate coupled with the backer, and the first piece and the second piece and are configured to be readily separated from one another without use of tools.

31. The financial product of claim 29, wherein:

each of the plurality of toy components is entirely planar both prior to removal of each of the plurality of toy components and when the plurality of toy components are reassembled with one another, and each of the plurality of toy components directly abuts another one of the plurality of toy components and extends in a plane that intersects and is angled with respect to a plane defined by the another one of the plurality of toy components when the plurality of toy components are reassembled.

* * * * *